United States Patent
Lu et al.

(10) Patent No.: US 10,484,684 B2
(45) Date of Patent: Nov. 19, 2019

(54) SIGNAL RESHAPING AND CODING IN THE IPT-PQ COLOR SPACE

(71) Applicant: DOLBY LABORATORIES LICENSING CORPORATION, San Francisco, CA (US)

(72) Inventors: Taoran Lu, Santa Clara, CA (US); Fangjun Pu, Sunnyvale, CA (US); Peng Yin, Ithaca, NY (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/564,185

(22) PCT Filed: Apr. 19, 2016

(86) PCT No.: PCT/US2016/028261
§ 371 (c)(1),
(2) Date: Oct. 3, 2017

(87) PCT Pub. No.: WO2016/172091
PCT Pub. Date: Oct. 27, 2016

(65) Prior Publication Data
US 2018/0131938 A1 May 10, 2018

Related U.S. Application Data

(60) Provisional application No. 62/150,910, filed on Apr. 22, 2015, provisional application No. 62/193,390, filed on Jul. 16, 2015.

(51) Int. Cl.
*H04N 19/126* (2014.01)
*H04N 9/67* (2006.01)
(Continued)

(52) U.S. Cl.
CPC .......... *H04N 19/126* (2014.11); *G06T 5/009* (2013.01); *H04N 9/67* (2013.01); *H04N 19/186* (2014.11);
(Continued)

(58) Field of Classification Search
CPC ....... H04N 11/04; H04N 19/126; H04N 19/61
See application file for complete search history.

(56) References Cited

U.S. PATENT DOCUMENTS 8,437,053 B2 * 5/2013 Edge .................... H04N 1/6058
358/520
9,077,994 B2 7/2015 Miller
(Continued)

FOREIGN PATENT DOCUMENTS

WO 2014/204865 12/2014

OTHER PUBLICATIONS

SMPTE ST 2084:2014 "High Dynamic Range EOTF of Mastering Reference Displays".
(Continued)

*Primary Examiner* — Frank F Huang

(57) ABSTRACT

In a method to improve the coding efficiency of high-dynamic range images coded in a perceptually quantized IPT color space (IPT-PQ), the values of the chroma components (P/T) of an input signal in IPT-PQ color space are divided by a factor of two before being encoded with standard-based encoders, such as AVC or HEVC; thus better matching the covariance characteristics of YCbCr signals. In addition, the order of the P and T chroma components may be swapped and the sign of the T chroma component may be inverted. Color transformation matrices for efficient forward and backward reshaping in the IPT-PQ color space are provided.

11 Claims, 4 Drawing Sheets

(51) Int. Cl.
H04N 19/85 (2014.01)
H04N 19/186 (2014.01)
G06T 5/00 (2006.01)

(52) U.S. Cl.
CPC .... H04N 19/85 (2014.11); *G06T 2207/20208* (2013.01)

(56) References Cited

U.S. PATENT DOCUMENTS

| | | |
|---|---|---|
| 9,497,456 B2 | 11/2016 | Su |
| 9,584,811 B2 | 2/2017 | Su |
| 9,628,808 B2 | 4/2017 | Su |
| 2016/0005349 A1 | 1/2016 | Atkins |
| 2016/0134872 A1* | 5/2016 | Su ................... H04N 19/176 375/240.03 |
| 2017/0251211 A1 | 8/2017 | Froehlich |

OTHER PUBLICATIONS

ITU-R B-T.1886 "Reference electro-Optical Transfer Function for Flat Panel Displays Used in HDTV Studio Production" Mar. 2011.

Ebner, Fritz "Development and Testing of a Color Space (IPT) with Improved Hue Uniformity" The Sixth Color Imaging Conference: Color Science, Systems, and Applications, IS&T, Scottsdale, AZ, Nov. 1998, pp. 8-11.

Baylon, D. et al "Response to Call for Evidence for HDR and WCG Coding: Arris, Dolby and InterDigital" ISO/IEC JTC1/SC29/WG11 MPEG2015/M36264, Jun. 2015, pp. 1-10.

HEVC (H.265) "ITU-T H.265, High Efficiency Video Coding" Oct. 2014.

* cited by examiner

SIGNAL RESHAPING AND CODING IN THE IPT-PQ COLOR SPACE

CROSS-REFERENCE TO RELATED APPLICATIONS

This application claims the benefit of U.S. Provisional Patent Application No. 62/150,910, filed on Apr. 22, 2015, and U.S. Provisional Patent Application No. 62/193,390, filed on Jul. 16, 2015, each of which are hereby incorporated by reference in their entirety.

TECHNOLOGY

The present invention relates generally to images. More particularly, an embodiment of the present invention relates to signal reshaping of images with high dynamic range in a perceptually quantized IPT color space (IPT-PQ).

BACKGROUND

As used herein, the term 'dynamic range' (DR) may relate to a capability of the human visual system (HVS) to perceive a range of intensity (e.g., luminance, luma) in an image, e.g., from darkest darks (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR. As appreciated by the inventors here, improved techniques for the coding of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Signal reshaping and coding of high dynamic range (HDR) images in the IPT-PQ color space is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the reshaping and coding of high-dynamic range images in a perceptually quantized IPT color space, to be referred to as IPT-PQ. In an encoder, given an input HDR image to be coded, if the image is already in the IPT-PQ space, then its chroma components (P/T) are divided by a factor of two before being encoded. Optionally, the order of the P and T chroma components may be swapped and/or the sign of the T component may be reversed. If the image is not in the IPT-PQ color space, appropriate color transformations translate it into a reshaped IPT-PQ color space where the chroma components (P/T) are automatically divided by a factor of two and optionally the chroma components are swapped and the sign of the T component is reversed. Such transformations allow the reshaped IPT-PQ image to resemble from an entropy point of view a YCbCr image and hence achieve better compression using standard tools optimized for YCbCr images. In the encoder, metadata characterizing the reshaping function are generated and are stored or transmitted as part of the encoded bit stream.

In a decoder, given an input image in a reshaped IPT-PQ color space and metadata characterizing how the image was color coded in an encoder, the decoder applies backward reshaping which may include one or more of the following steps: swapping the chroma components of the input image, reversing the sign of the T color component of the input image, multiplying the chroma components of the input image by a factor of two, and applying an IPT-PQ to non-linear LMS color transformation matrix to the input image, wherein the color transformation matrix may incorporate one or more of the chroma swapping, the chroma sign reversing, and the chroma scaling by a factor of two.

Example Video Delivery Processing Pipeline

Figure 1:
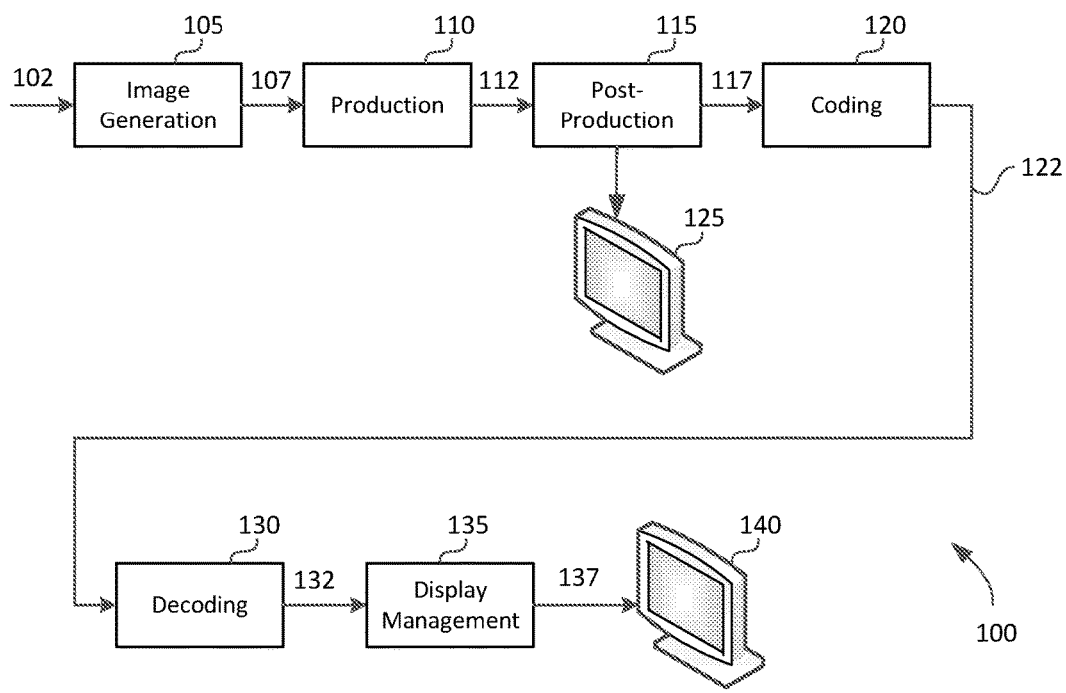
FIG. 1 depicts an example process for a video delivery pipeline.

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

The IPT-PQ Color Space

In a preferred embodiment, part of the processing pipeline, for example, coding (120), decoding (130), and display management (135) may be performed in what will be referred to as the IPT-PQ color space. The IPT-PQ color space was first introduced in PCT Application Ser. No. PCT/US2014/016304, filed on Feb. 13, 2014, for display management applications. IPT, as described in "*Development and testing of a color space (ipt) with improved hue uniformity*", by F. Ebner and M. D. Fairchild, in Proc. $6^{th}$ Color Imaging Conference: Color Science, Systems, and Applications, IS&T, Scottsdale, Ariz., November 1998, pp. 8-13 (to be referred to as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of a target display (e.g., 5,000 nits).

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in PCT Application with Ser. Number PCT/US2012/068212 (to be referred as the '212 application) titled "Perceptual luminance nonlinearity-based image data exchange across different display capabilities," by J. S. Miller et al., filed on Dec. 6, 2012, and incorporated herein by reference in its entirety, parts of which have been adopted by the SMPTE ST 2084 specification, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model.

Table 1 describes the calculation of the Perceptual Curve EOTF for converting digital video code values into absolute linear luminance levels at a point of display. Also included is the inverse EOTF calculation for converting absolute linear luminance into digital code values

TABLE 1

Exemplary Equation Definitions:
D = Perceptual Curve digital code value, SDI-legal unsigned integer, 10 or 12 bits
b = number of bits per component in digital signal representation, 10 or 12
V = normalized Perceptual Curve signal value, $0 \leq V \leq 1$
Y = normalized luminance value, $0 \leq Y \leq 1$
L = absolute luminance value, $0 \leq L \leq 10{,}000$ cd/m$^2$
Exemplary EOTF Decode Equations:

$$V = \frac{D - 4 \cdot 2^{b-10}}{1015 \cdot 2^{b-10}}$$

$$Y = \left(\frac{\max[(V^{1/m} - c_1), 0]}{c_2 - c_3 V^{1/m}}\right)^{1/n} \quad (t1)$$

$L = 10{,}000 \cdot Y$
Exemplary Inverse EOTF Encode Equations:

$$Y = \frac{L}{10{,}000}$$

$$V = \left(\frac{c_1 + c_2 Y^n}{1 + c_3 Y^n}\right)^m \quad (t2)$$

$D = \text{INT}(1015 \cdot V \cdot 2^{b-10}) + 4 \cdot 2^{b-10}$ (t3)
Exemplary Constants:

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Notes:
1. The operator INT returns the value of 0 for fractional parts in the range of 0 to 0.4999 ... and +1 for fractional parts in the range of 0.5 to 0.9999 ..., i.e. it rounds up fractions above 0.5.
2. All constants are defined as exact multiples of 12 bit rationals to avoid rounding concerns.
3. R, G, or B signal components are to be computed in the same way as the Y signal component described above.

Figure 2:
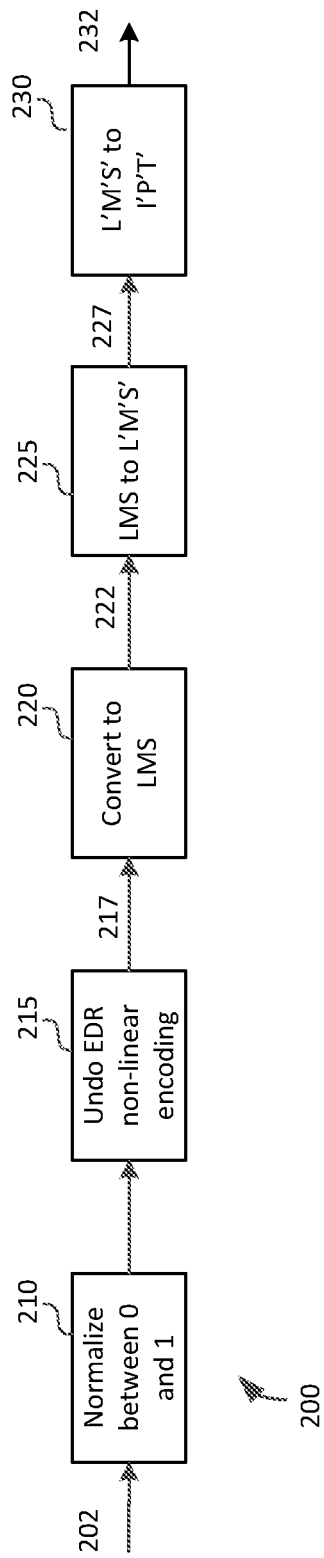
FIG. 2 depicts an example process color conversion to the IPT-PQ color space according to an embodiment of this invention.

FIG. 2 depicts an in more detail an example process (200) for the color conversion into the IPT-PQ color space according to an embodiment. As depicted in FIG. 2, given input signal (202) which is in a first color space (e.g., RGB), the color space transformation in the perceptually-corrected IPT color space (IPT-PQ) may comprise the following steps:

a) Optional step (210) may normalize the pixel values of the input signal (202) (e.g., 0 to 4095) into pixel values with a dynamic range between 0 and 1.

b) If the input signal (202) is gamma-coded or PQ-coded (e.g., per BT. 1866 or SMPTE ST 2084), optional step (215) may use the signal's EOTF (as provided by signal metadata) to reverse or undo the source display's conversion from code values to luminance. For example, if the input signal is gamma coded, then this step applies an inverse gamma function. If the input signal is PQ-encoded according to SMPTE ST 2084, then this step applies an inverse PQ function. In practice, the normalization step (210) and the inverse non-linear encoding (215) may be performed using pre-computed 1-D Look-up tables (LUTs) to generate a linear signal 217.

c) In step (220), linear signal 217 is converted from its original color space (e.g., RGB, XYZ, and the like) into the LMS color space. For example, if the original signal is in RGB, then this step may comprise two steps: an RGB to XYZ color transformation and an XYZ to LMS color transformation. In an embodiment, without limitation, the XYZ to LMS transformation may be given by $$\begin{pmatrix} L \\ M \\ S \end{pmatrix} = \begin{pmatrix} 0.4002 & 0.7076 & -0.0808 \\ -0.2263 & 1.1653 & 0.0457 \\ 0 & 0 & 0.9182 \end{pmatrix} \begin{pmatrix} X \\ Y \\ Z \end{pmatrix}. \quad (1a)$$

In an another embodiment, as described in U.S. Provisional Patent Application Ser. No. 62/056,093, filed on Sep. 26, 2014, titled "Encoding and decoding perceptually-quantized video content," (also filed, on Sep. 24, 2015, as PCT Application Ser. No. PCT/US2015/051964) which is incorporated herein by reference in its entirety, the overall coding efficiency in the IPT-PQ color space may be further increased if one incorporates a cross talk matrix $$\begin{pmatrix} 1-2c & c & c \\ c & 1-2c & c \\ c & c & 1-2c \end{pmatrix}$$

after the XYZ to LMS transformation. For example, for c=0.02, equation (1a) yields:

$$\begin{pmatrix} L \\ M \\ S \end{pmatrix} = \begin{pmatrix} 0.3797 & 0.7026 & -0.0583 \\ -0.2092 & 1.1329 & 0.0606 \\ 0.0035 & 0.0375 & 0.8808 \end{pmatrix} \begin{pmatrix} X \\ Y \\ Z \end{pmatrix} \quad (1b)$$

d) According to the Ebner paper, the traditional LMS to IPT color space conversion comprises applying first a non-linear power function to the LMS data and then applying a linear transformation matrix. While one can transform the data from LMS to IPT and then apply the PQ function to be in the IPT-PQ domain, in a preferred embodiment, in step (225) the traditional power function for a non-linear encoding of LMS to IPT is replaced with the PQ non-linear encoding of each one of the L, M, and S components. For example, the non-linear L', M', and S' values of signal (227) are computed the same way as the V signal in equation (t2), where the Y signal is replaced by the linear L, M, or S component values (222). In some embodiments, a normalized version of PQ encoding may be used, wherein the step of equation (t3) may be omitted and the range of output PQ values is between 0 and 1.

e) Using an LMS to IPT linear transform (e.g., as defined in the Ebner paper), step (230) completes the conversion of signal 222 to the IPT-PQ color space. For example, in an embodiment, the L'M'S' to IPT-PQ transform may be given by $$\begin{pmatrix} I' \\ P' \\ T' \end{pmatrix} = \begin{pmatrix} 0.400 & 0.4000 & 0.2000 \\ 4.4550 & -4.8510 & 0.3960 \\ 0.8056 & 0.3572 & -1.1628 \end{pmatrix} \begin{pmatrix} L' \\ M' \\ S' \end{pmatrix}. \quad (2)$$

IPT-PQ Versus YCbCr

Most of the existing video compression standards, such as MPEG-1, MPEG-2, AVC, HEVC, and the like, have been tested, evaluated, and optimized for gamma-coded images in the YCbCr color space; however, experimental results have shown that the IPT-PQ color space may provide a better representation format for high-dynamic range images with 10 or more bits per pixel per color component. However, 10-bit IPT-PQ signals may feature higher entropy in the two chroma (P/T) components than the corresponding 10-bit YCbCr signals, thus making them harder to compress using existing coding schemes. In this invention, novel reshaping techniques for IPT-PQ signals allow for efficient compression using standard-based coding tools.

Given a set of test sequences coded in a BT. 2020 Y'CbCr-PQ color format, Table 2 shows examples of computed average covariances in the three channels. As used herein, the term 'BT. 2020 Y'CbCr-PQ signal' denotes an ultra-high definition (UHD) signal with bit depth and color space defined by the ITU-R BT. 2020 Recommendation, but with PQ encoding (e.g., SMPTE ST 2084) instead of gamma coding (e.g., Rec. 709). For example, given a linear RGB signal in a BT. 2020 color space, the signal may be translated first to RGB-PQ using the equations in Table 1 and then to YCbCr-PQ using a standard RGB to YCbCr color transformation.

TABLE 2

Example covariance for Y'CbCr-PQ signals, at 10 bits

|    | Y' | Cb | Cr |
|----|----|----|----|
| Y' | 2.894940665203638 | -0.130406927453398 | 0.076640469667844 |
| Cb | -0.13040692745339 | 0.073005701812908 | -0.031397053894477 |
| Cr | 0.076640469667844 | -0.031397053894477 | 0.032053632983453 |

Table 3 shows the corresponding covariance when the signals are coded at 10 bits in the IPT-PQ color space.

TABLE 3

Example covariance for IPT-PQ signals, at 10 bits

|    | I' | P' | T' |
|----|----|----|----|
| I' | 2.581200469918747 | 0.123194992063226 | 0.223797556434782 |
| P' | 0.123194992063226 | 0.128651030252480 | 0.102748585130338 |
| T' | 0.223797556434782 | 0.102748585130338 | 0.290148499828772 |

Comparing these two covariance matrices, one can make the following observations:

a) The P channel corresponds better to the Cr channel and the T channel corresponds better to the Cb channel
b) The sign for Cb is opposite the sign of T. This is most likely because Cb represents B-Y and T approximates Y(Yellow)-B opponent colors.
c) The variance of the P channel is about four times that of the Cr channel and the variance of the T channel is about four times of the Cb channel. The cross-variances of IP and IT channels are about twice of the covariance of YCr and YCb.

All these indicate that if one:
a) Divides the pixel values of the chroma (PIT) components by two; note that dividing a pixel value by two is equivalent to shifting its binary representation to the right by one position;
b) Swaps the order of P and T (e.g., code ITP instead of IPT); and
c) Changes the sign of the T-related coefficients in the L'M'S' to IPT color transformation (equation (2)), then the two covariance matrices should be very similar. Table 4 shows an example of such a covariance matrix for a signal in a reshaped IPT-PQ color space, to be denoted as ITP-PQs

TABLE 4

Example covariance for reshaped IPT-PQ bits (ITP-PQ$_S$) signals, at 10 bits

|      | I' | T'rs | P'rs |
|------|----|------|------|
| I'   | 2.883036068633001 | -0.124986619764637 | 0.068822872310111 |
| T'rs | -0.124986619764637 | 0.081030996219102 | -0.028687738494879 |
| P'rs | 0.068822872310111 | -0.028687738494879 | 0.035932935147896 |

Figure 3:
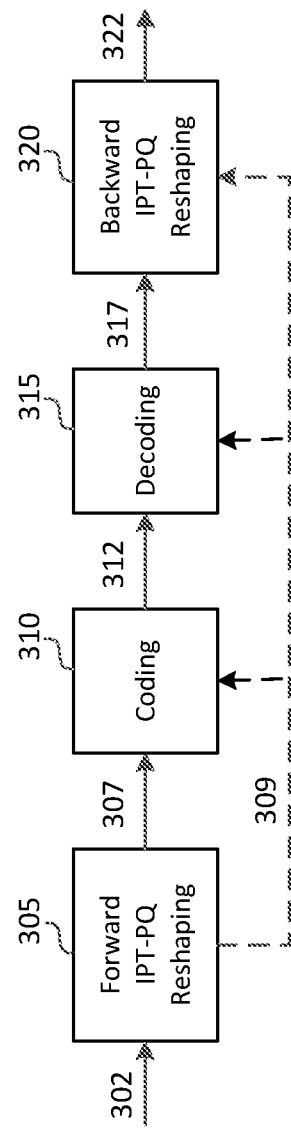
FIG. 3 depicts an example process for signal reshaping and coding according to an embodiment of this invention.

FIG. 3 depicts an example process for signal reshaping and coding in the IPT-PQ domain according to an embodiment. As depicted in FIG. 3, given input (302), the forward IPT-PQ reshaping block (305) applies, as needed, color transformation and/or PIT reshaping functions to generate ITP-PQ$_S$ signal (307). Reshaping-related metadata (309) may also be generated and communicated to subsequent blocks of the coding pipeline, such as the encoder (310), the decoder (315), and backward IPT-PQ reshaping (320).

Reshaping information may be signaled from an encoder to the rest of the pipeline in a number of embodiments. For example, in one embodiment where coding (310) uses HEVC Main 10 Profile, one may use metadata to signal to the decoder that the stream is coded in the IPT-PQ color space, and one may use the bit depth flags to denote that the chroma information is divided by two. For example, assuming the bit depth is 10 bits, one may define
bit_depth_luma_minus8=2,
bit_depth_chroma_minus8=1.
This denotes that the PIT components are converted to 9 bits; however, the encoder and the decoder still use the Main 10 Profile. More generally, one may define
bit_depth_chroma_minus8=bit_depth_luma_minus8−1.

In a second embodiment, the scaling factor for the P and T components may be signaled using supplemental enhancement information (SEI) (e.g., scaler_chroma=2 or scaler_chroma_flag=1 or 0). An example embodiment of an alternative SEI messaging structure is described later on in this specification.

In a third embodiment, one may transmit to the decoder the actual L'M'S' to IPT-PQ$_S$ color transformation matrix or the most appropriate IPT-PQ$_S$ to L'M'S' transformation matrix. For example, given the original equation (2), if one incorporates the division by 2 into the matrix, then the reshaped IP'rT'r signal may be generated using $$\begin{pmatrix} I' \\ P'r \\ T'r \end{pmatrix} = \begin{pmatrix} 0.400 & 0.4000 & 0.2000 \\ 2.2275 & -2.4255 & 0.1980 \\ 0.4028 & 0.1786 & -0.5814 \end{pmatrix} \begin{pmatrix} L' \\ M' \\ S' \end{pmatrix}. \quad (3)$$

In another embodiment, one may also incorporate into equation (2) both the sign change for the T component and the reversing of the order of the P and T components, then the reshaped IT'rsP'rs signal may be generated using $$\begin{pmatrix} I' \\ T'rs \\ P'rs \end{pmatrix} = \begin{pmatrix} 0.400 & 0.4000 & 0.2000 \\ -0.4028 & -0.1786 & 0.5814 \\ 2.2275 & -2.4255 & 0.1980 \end{pmatrix} \begin{pmatrix} L' \\ M' \\ S' \end{pmatrix}. \quad (4)$$

Figure 4:
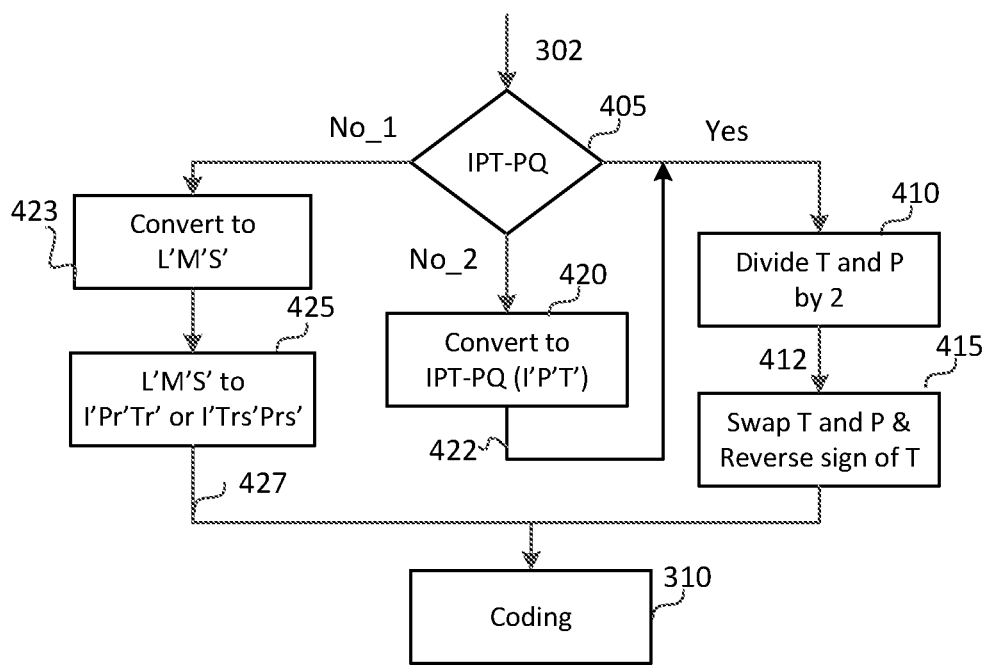
FIG. 4 depicts an example process for forward IPT-PQ reshaping according to an embodiment of this invention.

FIG. 4 depicts an example process flow for signal reshaping in an encoder according to an embodiment. Given input (302), a decision (405) is made according to its color format. If the input is already in the IPT-PQ color space, then one only needs to divide the P and T color components by two (410). Optionally, in step (415), one may also swap the T and P components and/or change the sign of the T component (515). This step is considered optional since most encoders are indifferent on the order by which the color components are encoded, and changing the sign of the T color component has almost no effect on its entropy, and thus, its compressibility.

If the input is not in the IPT-PQ space, then it has to be translated to IPT-PQ$_S$. In an embodiment, (No_2), conversion to IPT-PQ (420), as depicted in FIG. 2, may include: a) transforming the input from the original color space into the LMS color space, b) applying perceptual quantization (225) to convert from LMS to the L'M'S' color space, and then c) applying an L'M'S' to IPT transformation matrix (e.g., equation (2)) to convert to the IPT-PQ color space. Given signal (422) in the IPT-PQ color space, one may proceed with the reshaping steps (e.g., steps (410) and (415)). Alternatively, (No_1), after one converts the input signal into the L'M'S color space (e.g., step 423), in step (425), one may apply directly transformation matrices (3) or (4), which incorporate the reshaping transformations, to generate directly signals IPrTr or ITrsPrs. After color transformations and reshaping, the IPT-PQ$_S$ signal together with appropriate reshaping-related metadata (309) are passed to the coding unit (310).

Returning to FIG. 3, before encoding (310), reshaped signal (307) may be pre-processed (not shown) according to the pre-processing requirements of encoder (310). Such pre-processing may include chroma sub-sampling, scaling, cropping, additional quantization, and other image processing operations known by those skilled in the art. In some embodiments, reshaping may also be performed after certain pre-processing operations (e.g., chroma sub-sampling). In a receiver, the coded bitstream (312) is decoded using decoder (315) and metadata (309) to generate a decoded IPT-PQ signal (317). After decoding, block (320) applies backward reshaping and any necessary color transformations to translate the decoded ITP-PQ$_S$ signal (317) back to unshaped IPT-PQ or another color space (e.g., RGB or YCbCr) for further processing, such as storage or display management.

Figure 5A:
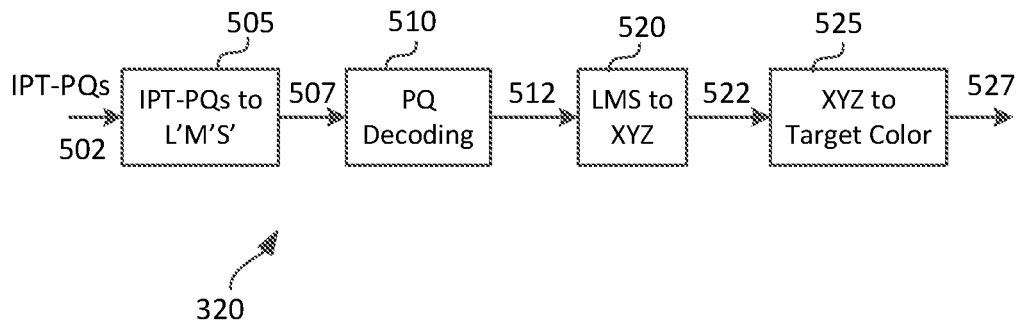
FIG. 5A and FIG. 5B depict example process for backward IPT-PQ reshaping according to embodiments of this invention.

FIG. 5A depicts an example of backward IPT-PQ reshaping (320) according to an embodiment. Backward reshaping follows the reverse process of forward reshaping. Hence, given a reshaped IPT-PQ input (IPT-PQ$_S$) (502), the input is first converted back to L'M'S' using block (505). For example, given equation (2) in an encoder, without any reshaping, the non-linear IPT-PQ (I'P'T') to non-linear LMS (L'M'S') transformation is given by $$\begin{pmatrix} L' \\ M' \\ S' \end{pmatrix} = \begin{pmatrix} 1 & 0.0976 & 0.2052 \\ 1 & -0.1139 & 0.1132 \\ 1 & 0.0326 & -0.6769 \end{pmatrix} \begin{pmatrix} I' \\ P' \\ T' \end{pmatrix}. \quad (5)$$

If the encoder applied the transformation matrix of equation (3), where a reshaping factor of ½ was used, then the corresponding non-linear IPT-PQ to non-linear LMS transformation is given by $$\begin{pmatrix} L' \\ M' \\ S' \end{pmatrix} = \begin{pmatrix} 1 & 2*0.0976 & 2*0.2052 \\ 1 & 2*(-0.1139) & 2*0.1132 \\ 1 & 2*0.0326 & 2*(-0.6769) \end{pmatrix} \begin{pmatrix} I' \\ P'r \\ T'r \end{pmatrix} \quad (6)$$

$$= \begin{pmatrix} 1 & 0.1952 & 0.4104 \\ 1 & -0.2278 & 0.2264 \\ 1 & 0.0652 & -1.3538 \end{pmatrix} \begin{pmatrix} I' \\ P'r \\ T'r \end{pmatrix}.$$

Similarly, if the encoder applied the transformation matrix of equation (4), where a reshaping factor of ½ was used, the original P and T components were swapped, and there was a change of sign for the T component, then the corresponding non-linear IPT-PQ to non-linear LMS transformation is given by $$\begin{pmatrix} L' \\ M' \\ S' \end{pmatrix} = \begin{pmatrix} 1 & -0.4104 & 0.1952 \\ 1 & -0.2264 & 0.2278 \\ 1 & 1.3538 & 0.0652 \end{pmatrix} \begin{pmatrix} I' \\ T'rs \\ P'rs \end{pmatrix}. \quad (7)$$

Figure 5B:
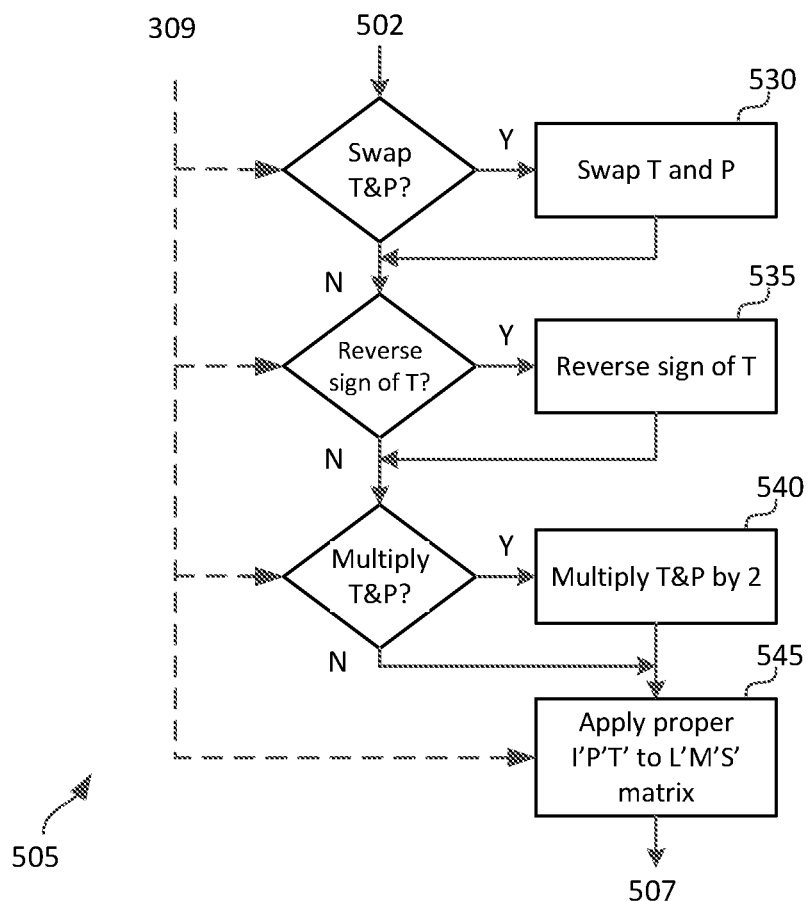

FIG. 5B depicts in more detail an example of processing steps within the IPT-PQ$_S$ to L'M'S' color transformation step (505). For example, a decoder may analyze received metadata (309) to decide whether the order of the T and P components need to be swapped (530), whether the sign of the T color component needs to be reversed (535), whether the T and P color components need to be multiplied by 2, and which is the most appropriate I'P'T' to L'M'S' color transformation (e.g., equation (5), (6), or (7)). Note that the order of these processing steps is interchangeable. For example, swapping the T and P components (530) may occur after multiplying T and P by a factor of two (540), and multiplying T and P by a factor of two (540), if needed, may occur before or after applying the proper IPT to LMS transformation (545).

Following the IPT-PQ$_S$ to L'M'S' transformation (505), which generates L'M'S' signal (507), block (510) applies an inverse PQ transformation to generate linear LMS data (512). The linear LMS data (512) is then translated to the desired color space. For example, if the target color space is RGB, LMS to RGB color transformation may comprise two steps: a) an LMS to XYZ color transformation, followed by b) an XYZ to RGB color transformation. Alternatively, the two steps may be combined using a single 3×3 matrix multiplication, which is equivalent to the product of the LMS to XYZ and XYZ to RGB color transformation matrices. In a preferred embodiment, the LMS to XYZ color transformation should be the inverse of the XYZ to LMS color transformation in the encoder. For example, given equation (1b), the LMS to XYZ transformation is given by $$\begin{pmatrix} X \\ Y \\ Z \end{pmatrix} = \begin{pmatrix} 1.95856 & -1.22173 & 0.213693 \\ 0.362909 & 0.658327 & -0.0212727 \\ -0.0232335 & -0.231735 & 1.13539 \end{pmatrix} \begin{pmatrix} L \\ M \\ S \end{pmatrix}. \quad (8)$$

SEI Message Syntax for Reshaping Information

Table 5 depicts an example of SEI syntax for signaling reshaping information from an encoder to a decoder according to an embodiment. Terms in bold are new and are described later on. The definition of the remaining terms is consistent with the existing definitions in the HEVC (H.265) specification, "*ITU-T H.265, High efficiency video coding,*" (October 2014), which is incorporated herein by reference in its entirety.

range of 0 to $2^{32}-2$, inclusive. In an embodiment, values of signal_reshape_id from 0 to 255 and from 512 to $2^{31}-1$ may be used as specified herein. Values of signal_reshape_id from 256 to 511, inclusive, and from $2^{31}$ to $2^{32}-2$, inclusive may be reserved for future use. Decoders may ignore all signal reshaping information SEI messages containing a value of signal_reshape_id in the range of 256 to 511, inclusive, or in the range of $2^{31}$ to $2^{32}-2$, inclusive, and bitstreams should not contain such values.

TABLE 5

Example SEI message syntax to signal reshaping information

| signal_reshaping_info( payloadSize ) { | Descriptor |
|---|---|
| signal_reshape_id | ue(v) |
| signal_reshape_cancel_flag | u(1) |
| if( !signal_reshape_cancel_flag ) { | |
|   signal_reshape_persistence_flag | u(1) |
|   signal_reshape_video_signal_type_present_flag | u(1) |
|   if( signal_reshape_video_signal_type_present_flag ) { | |
|     XYZtoLMS_matrix_present_flag | u(1) |
|     if( XYZtoLMS_matrix_present_flag ) { | |
|       for( c = 0; c < 3; c++ ) | |
|         for( i = 0; i < 3; i++ ) | |
|           XYZtoLMS_coeffs[ c ][ i ] | i(16) |
|     } | |
|     LMStoIPT_matrix_present_flag | u(1) |
|     if( LMStoIPT_matrix_present_flag ) { | |
|       for( c = 0; c < 3; c++ ) | |
|         for( i = 0; i < 3; i++ ) | |
|           LMStoIPT_coeffs[ c ][ i ] | i(16) |
|     } | |
|   } | |
|   signal_reshape_input_bit_depth_minus8 | ue(v) |
|   signal_reshape_bit_depth_minus8 | ue(v) |
|   signal_reshape_full_range_flag | u(1) |
|   signal_reshape_model_present_flag | u(1) |
|   if( signal_reshape_model_present_flag ) { | |
|     coef_log2_denom_minus14 | ue(v) |
|     for( c = 0; c < 3; c++ ) { | |
|       signal_reshape_model_id[ c ] | ue(v) |
|       signal_reshape_num_pivots_minus2 [ c ] | ue(v) |
|       for( i = 1; i < signal_reshape_num_pivots_minus2 [ c ] + 1; i++ ) { | |
|         signal_reshape_coded_pivot_value[ c ][ i ] | u(v) |
|       } | |
|       for( i = 0; i < signal_reshape_num_pivots_minus2 [ c ] + 1; i++ ) { | |
|         if( signal_reshape_model_id[ c ] = = 0 ) { | |
|           poly_order_minus1[ c ][ i ] | ue(v) |
|           for( j = 0;j <= poly_order_minus1[ c ][ i ] + 1; j++ ) { | |
|             poly_coef_int[ c ][ i ][ j ] | se(v) |
|             poly_coef_frac[ c ][ i ][ j ] | u(v) |
|           } | |
|         } else if( signal_reshape_model_id[ c ] = = 1) { | |
|           for( j = 0; j < 4; j++ ) { | |
|             pow_coef_int[ c ][ i ][ j ] | se(v) |
|             pow_coef_frac[ c ][ i ][ j ] | u(v) |
|           } | |
|         } else if( signal_reshape_model_id[ c ] = = 2 ) { | |
|           signal_reshape_target_pivot_value[ c ][ i ] | u(v) |
|           if( i = = signal_reshape_num_pivots_minus2 [ c ] ) | |
| signal_reshape_target_pivot_value[ c ][signal_reshape_num_pivots_minus2 [ c ]+1] | u(v) |
|         } | |
|       } | |
|     } | |
|   } | |
| } | |

The syntax in Table 5 allows for an explicit transmission of XYZ to LMS and LMS to IPT-PQ matrix coefficients. Alternatively or in addition, one may use this syntax to specify the scaling factor (e.g., 2.0) used for scaling the pixel values of the P and T chroma components. In Table 5, the semantics of the parameters in bold are as follows:

signal_reshape_id contains an identifying number that may be used to identify the purpose of the signal reshaping information. The value of signal_reshape_id may be in the signal_reshape_cancel_flag equal to 1 indicates that the signal reshaping information SEI message cancels the persistence of any previous signal reshaping information SEI message output that applies to the current layer of the video stream. signal_reshape_cancel_flag equal to 0 indicates that signal reshaping information follows.

signal_reshape_persistence_flag specifies the persistence of the signal reshaping information SEI message for the current layer. signal_reshape_persistence_flag equal to 0 specifies that the signal reshaping information applies to the current picture only. Let picA be the current picture. signal_reshape_persistence_flag equal to 1 specifies that the signal reshaping information persists for the current layer in output order until either of the following conditions is true:
  A new CLVS of the current layer begins.
  The bitstream ends.
  A picture picB in the current layer in an access unit containing a signal reshaping information SEI message with the same value of signal_reshape_id and applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

signal_reshape_video_signal_type_present_flag equal to 1 specifies that syntax elements XYZtoLMS_matrix_present_flag and LMStoIPT_matrix_present_flag are present, signal_reshape_video_signal_type_present_flag equal to 0 specifies that syntax elements XYZtoLMS_matrix_present_flag and LMStoIPT_matrix_present_flag are not present.

XYZtoLMS_matrix_present_flag equal to 1 indicates that the syntax elements XYZtoLMS_coeffs[c][i], for c and i in the range of 0 to 2, inclusive, are present. XYZtoLMS_matrix_present_flag equal to 0 indicates that the syntax elements XYZtoLMS_coeffs[c][i], for c and i in the range of 0 to 2, inclusive, are not present.

XYZtoLMS_coeffs[c][i] specifies the value of the three-by-three from color primary XYZ to color primary LMS matrix coefficients. The value of XYZtoLMS_coeffs[c][i] shall be in the range of $-2^{15}$ to $2^{15}-1$, inclusive. When XYZtoLMS_coeffs[c][i] is not present, the default XYZ to LMS matrix is used.

When XYZtoLMS_matrix_present_flag is equal to 0, the default XYZ to LMS matrix in floating point is specified as follows:

fP_XYZtoLMS_Matrix[3][3] =
{
  {0.379702729270854   0.702595741823277   −0.058294843714358}
  {−0.209241415246258   1.132854830780842   0.060621130953413}
  {0.003478802327033   0.037458174951104   0.880793856972993}
}.

When XYZtoLMS_matrix_present_flag is equal to 1, the XYZ to LMS matrix in floating point is converted as follows:

fp_XYZtoLMS_coeffs[c][i]=(float) XYZtoLMS_coeffs[c][i]/(float) (1<<14).

Assuming MatrixInput denotes normalized XYZ input data within the range of [0, 1], inclusively, the LMS matrixOutput[c] for c=0, 1 and 2 is derived as follows:

$$matrixOutput[c] = Clip3(0, 1, (\text{fp\_XYZtoLMS\_coeffs}[c][0]*matrixInput[0] + \text{fp\_XYZtoLMS\_coeffs}[c][1]*matrixInput[1] + \text{fp\_XYZtoLMS\_coeffs}[c][2]*matrixInput[2])).$$

LMStoIPT_matrix_present_flag equal to 1 indicates that the syntax elements LMStoIPT_coeffs[c][i], for c and i in the range of 0 to 2, inclusive, are present. LMStoIPT_matrix_present_flag equal to 0 indicates that the syntax elements LMStoIPT_coeffs[c][i], for c and i in the range of 0 to 2, inclusive, are not present.

LMStoIPT_coeffs[c][i] specifies the value of the three-by-three from LMS to IPT matrix coefficients. The value of LMStoIPT_coeffs[c][i] shall be in the range of $-2^{15}$ to $2^{15}-1$, inclusive. When LMStoIPT_coeffs[c][i] is not present, the default LMS to IPT matrix is used.

When LMStoIPT_matrix_present_flag is equal to 0, the default LMS to IPT matrix in floating point is specified as follows:

fp_LMStoIPT_Matrix[3][3] =
{
  {0.400000000000000   0.400000000000000   0.200000000000000}
  {4.455000000000000   −4.851000000000000   0.396000000000000}
  {0.805600000000000   0.357200000000000   −1.162800000000000}
}.

When LMStoIPT_matrix_present_flag is equal to 1, the LMS to IPT matrix in floating point is converted as follows:

fp_LMStoIPT_coeffs[c][i]=(float) LMStoIPT_coeffs[c][i]/(float) (1<<12).

Assuming MatrixInput is normalized LMS input data within the range of [0, 1], inclusively, the IPT matrixOutput[c] for c=0, 1 and 2 is derived as follows:

$$matrixOutput[c] =$$
$$Clip3(0, 1, (fp\_LMStoIPT\_coeffs[c][0]*matrixInput[0] +$$
$$fp\_LMStoIPT\_coeffs[c][1]*matrixInput[1] +$$
$$fp\_LMStoIPT\_coeffs[c][2]*matrixInput[2])).$$

signal_reshape_input_bit_depth_minus8 specifies the bit depth of color components of the associated pictures for purposes of interpretation of the signal reshaping information SEI message. When any signal reshaping information SEI messages is present with the value of signal_reshape_input_bit_depth not equal to the bit depth of the coded colour components, the SEI message refers to the hypothetical result of a transcoding operation performed to convert the coded video to a converted video with bit depth equal to signal_reshape_input_bit_depth.

The value of signal_reshape_input_bit_depth_minus8 shall be in the range of 0 to 8, inclusive.

signal_reshape_bit_depth specifies the bit depth of the output of the signal reshaping function described by the signal reshaping information SEI message.

signal_reshape_full_range_flag has the same semantics as specified in clause E.3.1 of the HEVC specification for the video_full_range_flag syntax element, except that signal_reshape_full_range_flag specifies the colour space of the reshaped reconstructed picture, rather than the colour space used for the CLVS.

signal_reshape_model_present_flag equal to 1 specifies that syntax elements coef_log 2_denom_minus14, signal_reshape_model_id, signal_reshape_num_pivots_minus2, signal_reshape_coded_pivot_value, poly_order_minus1, poly_coef_int, poly_coef_frac, pow_coef_int, pow_coef_frac and signal_reshape_target_pivot_value are present. signal_reshape_model_present_flag equal to 0 specifies that syntax elements coef_log 2_denom_minus14, signal_reshape_model_id, signal_reshape_num_pivots_minus2, signal_reshape_coded_pivot_value, poly_order_minus1, poly_coef_int, poly_coef_frac, pow_coef_int, pow_coef_frac and signal_reshape_target_pivot_value are not present.

coeff_log 2_denom_minus14 plus 14 specifies the number of fractional bits for signal reshaping related coefficients. The value of coeff_log 2_denom_minus14 shall be in the range of 0 to 9, inclusive. When not present, the value of coeff_log 2_denom_minus14 is inferred to be equal to 0.

signal_reshape_model_id[c] specifies the model utilized for reshaping the coded data into the target value for the c-th component. Values greater than 3 are reserved for future use and shall not be present in bitstreams conforming to this version of this Specification. Decoders shall ignore all signal reshaping SEI messages that contain a value of signal_reshape_model_id[c] greater than 3 and bitstreams shall not contain such values. When not present, the value of signal_reshape_model_id[c] is inferred to be 0.

A signal_reshape_model_id of 0 corresponds to a polynomial reshaping; a signal_reshape_model_id of 1 corresponds to a power function reshaping; and signal_reshape_model_id of 2 corresponds to a user-defined table mapping. When signal_reshape_model_present_flag equal to 0, the reshaping model is set to be identity linear model with one piece for all three components.

signal_reshape_num_pivots_minus2[c] specifies the number of pivot points in the piece-wise signal reshaping function without counting the two default end points, 0 and $2^{signal\_reshape\_input\_bit\_depth}-1$. When not present, the value of signal_reshape_num_pivots_minus2[c] is inferred to be 0.

signal_reshape_coded_pivot_value[c][i] specifies the value of the i-th pivot point for the c-th component. The number of bits used for the representation of the signal_reshape_coded_pivot_value is ((signal_reshape_input_bit_depth_minus8+15)>>3)<<3. For the default two ending points, signal_reshape_coded_pivot_value[c][0] is set to 0 and signal_reshape_coded_pivot_value[c][signal_reshape_num_pivots_minus2[c]+1] is set to $2^{signal\_reshape\_input\_bit\_depth}-1$.

poly_order_minus1[c][i] plus 1 specifies the order of polynomial function for the i-th piece in the c-th component. The value of poly_order_minus1[c][i] shall be in the range of 0 to 1, inclusive. When not present, the value of poly_order_minus1[c][i] is inferred to be 0.

poly_coef_int[c][i][j] specifies the integer portion of fp_poly_coef[c][i][j]. When not present, the value of poly_coef_int[c][0][0] is inferred to be 0 and poly_coef_int[c][0][1] is inferred to be 1.

poly_coef_frac[c][i] [j] specifies the fractional portion of fp_poly_coef[c][i][j]. When not present, the value of poly_coef_frac[c][0][0] is inferred to be 0 and poly_coef_frac[c][0][1] is inferred to be 0.

fp_poly_coef[c][i][j] specifies the floating point value of j-th order polynomial coefficients for the i-th piece in the c-th component.

fp_poly_coef[c][i][j]=(float)(poly_coef_int[c][i][j]<<
 (coeff_log 2_denom_minus14+14)+poly_coef_
 frac[c][i][j])/(1<<(coeff_log 2_denom_minus14+
 14))

fp_s_in=(float)s_in/(float)((1<<signal_reshape_input_
 bit_depth_minus8+8)-1)

$$fp\_s\_out = \sum_{k=0}^{poly\_order\_minus1+1} fp\_poly\_coef[c][i][j] * fp\_s\_in$$

s_out=Clip3(0,((1<<signal_reshape_bit_depth_mi-
 nus8+8)-1),round(fp_s_out*(float)((1<<signal_
 reshape_bit_depth_minus8+8)-1))), where s_in is the input sample value of for the i-th piece in the c-th color component and s_out is the output sample value of for the i-th piece in the c-th color component after reshaping.

pow_coef_int[c][i] [j] specifies the integer portion of fp_pow_coef[c][i][j].

pow_coef_frac[c][i][j] specifies the fractional portion of fp_pow_coef[c][i][j].

fp_pow_coef[c][i][j] specifies the value of j-th coefficients for i-th piece in the c-th component.

fp_pow_coef[c][i][j]=(float)(pow_coef_int[c][i][j]<<
 (coeff_log 2_denom_minus14+14)+pow_coef_
 frac[c][i][j])/(float)(1<<(coeff_log 2_denom_
 minus14+14))

fp_s_in=(float)s_in/(float)((1<<signal_reshape_input_
  bit_depth_minus8+8)−1)

fp_s_out=fp_pow_coef[c][i][2]*(fp_s_in−fp_pow_
  coef[c][i][0])^fp_pow_coef[c][i][3]+fp_pow_
  coef[c][i][1]

s_out=Clip3(0,((1<<signal_reshape_bit_depth_mi-
  nus8+8)−1),round(fp_s_out*(float)((1<<signal_
  reshape_bit_depth_minus8+8)−1))), where s_in is the input sample value of for the i-th piece in the c-th color component and s_out is the output sample value of for the i-th piece in the c-th color component after reshaping.

signal_reshape_target_pivot_value][c][i] specifies the reshaped value of the i-th pivot point for the c-th component. The number of bits used for the representation of the signal_reshape_target_pivot_value is ((signal_reshape_bit_depth_minus8+15)>>3)<<3.

As an example, to signal to a decoder that the encoder used the default XYZ to LMS and LMS to IPT matrices and to simply multiply by the P and T components by 2.0, the following parameters in Table 5 may be defined as:
signal_reshape_video_signal_type_present_flag=0//use default matrices
signal_reshape_model_present_flag=1
signal_reshape_model_id[c]=0, for c=0, 1, 2//polynomial-based reshaping
signal_reshape_num_pivots_minus2[c]=0, for c=0, 1, 2//one piece
poly_order_minus[c][i]=0; for i=0, c=0, 1, 2//first order polynomial (ax+b)
poly_coef_int[c][i][j]=1; for c=0, i=0; j=0; //No scaling for I (a=1)
poly_coef_int[c][i][j]=2; for c=1, 2; i=0, j=0//Scale P and T by 2 (a=2)
poly_coef_int[c][i][j]=0; for c=0, 1, 2; i=0, 1, 2; j=1; //Offset (b) for I, P and T is 0
poly_coef_frac[c][i][j]=0; for c=0, 1, 2; i=0,1, j=0,1//No fractions in the scaling factors and offsets.

Some embodiment may use more sophisticated linear or non-linear reshaping functions as described in PCT Application Ser. No. PCT/US2012/062932, filed on Nov. 1, 2012, PCT Application Ser. No. PCT/US2014/031716, filed on Mar. 25, 2014, and PCT Application Ser. No. PCT/US2014/042583, filed on Jun. 16, 2014, each of which is hereby incorporated by reference in its entirety. Such functions may be signalled as piece-wise polynomials, where their segments, order of each segment, and coefficients for each segment may be defined using the syntax defined in Table 5 (e.g., poly_order_minus1[c][i], pow_coef_int[c][i][j], and pow_coef_frac[c][i][j]).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to signal reshaping and coding of images with enhanced dynamic range, such as those described herein. The computer and/or IC may compute any of a variety of parameters or values that relate to the signal reshaping and coding processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to signal reshaping and coding of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient signal reshaping and coding of HDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to improve the compression efficiency of high-dynamic range images, the method comprising:
  accessing with a processor an input image in a first color space;
  testing whether the first color space is a perceptually-quantized IPT (IPT-PQ) color space;
  if the test is positive, then
    dividing with a processor pixel values of the chroma components (T/P) of the input image by two to generate a first reshaped image;

else
converting with a processor the input image to a second reshaped image in a reshaped IPT-PQ color space, wherein for an image in the reshaped IPT-PQ color space, pixel values of the chroma components (T/P) are one half of the corresponding pixel values of the chroma components of the same image in the IPT-PQ color space.

2. The method of claim 1 wherein the input image is a high dynamic range image.

3. The method of claim 1, wherein converting with the processor the input image to a second reshaped image in a reshaped IPT-PQ color space comprises a color transformation from non-linear LMS (L'M'S') to reshaped IPT-PQ values (I'P'rT'r) using $$\begin{pmatrix} I' \\ P'r \\ T'r \end{pmatrix} = \begin{pmatrix} 0.400 & 0.4000 & 0.2000 \\ 2.2275 & -2.4255 & 0.1980 \\ 0.4028 & 0.1786 & -0.5814 \end{pmatrix} \begin{pmatrix} L' \\ M' \\ S' \end{pmatrix}.$$

4. The method of claim 1, wherein if the test is negative, processing further comprises:
converting with a processor the input image to a second image in the IPT-PQ color space; and
dividing with a processor pixel values of the chroma components (T/P) of the second image by two to generate the first reshaped image.

5. The method of claim 1, further comprising generating a coded bitstream using an encoder and an image based on either the first reshaped image or the second reshaped image.

6. The method of claim 1, further comprising generating metadata indicating one or more of the following for the first reshaped image or the second reshaped image: a bit depth of the luma component, a bit depth of the chroma component, a scaling factor for the values of the chroma components, a flag on whether the chroma components are swapped, a flag on whether the sign of pixel values of the T chroma component values was changed, and a color transformation table related to converting the input signal to the second reshaped image.

7. In a decoder, a method to reconstruct an input image coded in a reshaped perceptually-quantized IPT (IPT-PQ) color space, the method comprising:

accessing metadata characterizing the color transformation of the input image in an encoder from a first color space to the reshaped IPT-PQ color space; and
transforming by a processor the input image from the reshaped IPT-PQ color space to an output image in an output color space, wherein the transforming step comprises one or more of the following steps:
swapping the chroma components of the input image;
reversing the sign of pixel values of the T color component of the input image;
multiplying pixel values of the chroma components of the input image by a factor of two;
applying an IPT to non-linear LMS color transformation matrix to the input image, wherein the color transformation may incorporate one or more of the chroma swapping, the chroma sign reversing, or the chroma multiplying by a factor of two.

8. The method of claim 7, wherein applying the I'P'T' to non-linear LMS color transformation matrix comprises applying the following transformation:

$$\begin{pmatrix} L' \\ M' \\ S' \end{pmatrix} = \begin{pmatrix} 1 & 0.0976 & 0.2052 \\ 1 & -0.1139 & 0.1132 \\ 1 & 0.0326 & -0.6769 \end{pmatrix} \begin{pmatrix} I' \\ P' \\ T' \end{pmatrix}.$$

9. The method of claim 7, wherein applying the I'P'T' to non-linear LMS color transformation matrix comprises applying the following transformation:

$$\begin{pmatrix} L' \\ M' \\ S' \end{pmatrix} = \begin{pmatrix} 1 & 0.1952 & 0.4104 \\ 1 & -0.2278 & 0.2264 \\ 1 & 0.0652 & -1.3538 \end{pmatrix} \begin{pmatrix} I' \\ T'r \\ P'r \end{pmatrix}.$$

10. An apparatus comprising a processor and configured to perform the method recited in claim 1.

11. A non-transitory computer-readable storage medium having stored thereon computer-executable instruction for executing a method with one or more processors in accordance with claim 1.

* * * * *